(12) United States Patent
Kasuya et al.

(10) Patent No.: US 9,441,576 B2
(45) Date of Patent: Sep. 13, 2016

(54) WASTE HEAT UTILIZATION DEVICE FOR INTERNAL COMBUSTION ENGINE

(75) Inventors: Junichiro Kasuya, Isesaki (JP); Yasuaki Kanou, Maebashi (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 879 days.

(21) Appl. No.: 12/867,681

(22) PCT Filed: Feb. 12, 2009

(86) PCT No.: PCT/JP2009/052310
§ 371 (c)(1),
(2), (4) Date: Aug. 13, 2010

(87) PCT Pub. No.: WO2009/101977
PCT Pub. Date: Aug. 20, 2009

(65) Prior Publication Data
US 2010/0307155 A1 Dec. 9, 2010

(30) Foreign Application Priority Data
Feb. 14, 2008 (JP) .................................. 2008-033024

(51) Int. Cl.
*F02D 23/00* (2006.01)
*F02G 5/04* (2006.01)
*F01K 23/06* (2006.01)

(52) U.S. Cl.
CPC ............... *F02G 5/04* (2013.01); *F01K 23/065* (2013.01); *F02G 2260/00* (2013.01); *Y02T 10/166* (2013.01)

(58) Field of Classification Search
CPC .... F01K 23/065; F02G 5/04; F02G 2260/00; Y02T 10/166
USPC .................................. 60/602, 604, 614, 616
See application file for complete search history.

(56) References Cited

U.S. PATENT DOCUMENTS

| 4,471,622 A * | 9/1984 | Kuwahara ........................ 60/667 |
| 7,578,139 B2 * | 8/2009 | Nishikawa et al. ......... 62/228.3 |
| 2003/0213246 A1 * | 11/2003 | Coll et al. ........................ 60/653 |
| 2004/0020206 A1 * | 2/2004 | Sullivan et al. ................ 60/670 |

(Continued)

FOREIGN PATENT DOCUMENTS

| DE | 10 2007 033 611 | 1/2009 |
| DE | 10 2009 024 776 | 12/2010 |
| FR | 2 868 809 | 10/2005 |
| FR | 2 884 556 | 10/2006 |
| JP | 2001-027118 | 1/2001 |
| JP | 2005-30727 | 2/2005 |

(Continued)

*Primary Examiner* — Thomas Denion
*Assistant Examiner* — Matthew T Largi
(74) *Attorney, Agent, or Firm* — Cozen O'Connor (57) ABSTRACT

Control means (32) that controls the actuation of Rankine cycle (8) is provided. An evaporator (10) is capable of absorbing heat from the waste heat of the internal combustion engine (4) with an upper limit of preset maximum heat absorption amount and transferring the heat to working fluid. The control means (32) controls the flow rate of the working fluid so that the working fluid evaporated by the evaporator (10) comes into a superheated state in a heater (18), when the working fluid enters the evaporator (10) at a flow rate equal to or lower than preset flow rate at which the working fluid can absorb the preset maximum heat absorption amount of heat, and controls the flow rate of the working fluid so that the working fluid that overflows the evaporator (10) is evaporated by the heater (18) and then comes into the superheat state, when the working fluid enters the evaporator (10) at a flow rate higher than the preset flow rate.

6 Claims, 5 Drawing Sheets

(56) References Cited

U.S. PATENT DOCUMENTS

| | | | | |
|---|---|---|---|---|
| 2004/0216483 | A1* | 11/2004 | Inaba et al. | 62/498 |
| 2005/0262842 | A1* | 12/2005 | Claassen et al. | 60/618 |
| 2005/0262858 | A1* | 12/2005 | Inaba et al. | 62/190 |
| 2006/0026981 | A1* | 2/2006 | Inaba et al. | 62/238.6 |
| 2006/0101821 | A1* | 5/2006 | Sato et al. | 60/645 |
| 2006/0168963 | A1* | 8/2006 | Sato et al. | 60/645 |
| 2006/0201153 | A1* | 9/2006 | Kurotani et al. | 60/616 |
| 2006/0225421 | A1* | 10/2006 | Yamanaka et al. | 60/645 |
| 2006/0254276 | A1* | 11/2006 | Sato et al. | 60/645 |
| 2007/0245737 | A1* | 10/2007 | Inaba et al. | 60/670 |
| 2009/0151356 | A1* | 6/2009 | Ast et al. | 60/660 |
| 2010/0101224 | A1* | 4/2010 | Kasuya et al. | 60/597 |
| 2010/0187319 | A1* | 7/2010 | Isom et al. | 237/12 |
| 2010/0205950 | A1* | 8/2010 | Hoetger et al. | 60/320 |

FOREIGN PATENT DOCUMENTS

| | | | | | |
|---|---|---|---|---|---|
| JP | 2005030727 A | * | 2/2005 | | F25B 1/00 |
| JP | 2005-201067 | | 7/2005 | | |
| JP | 2005201067 A | * | 7/2005 | | F02G 5/00 |
| JP | 2006144744 A | * | 6/2006 | | F02G 5/04 |
| JP | 2006-177266 | | 7/2006 | | |
| JP | 2006177266 A | * | 7/2006 | | F01K 23/10 |
| JP | 2008231981 A | * | 10/2008 | | F01K 23/06 |
| JP | 2008255959 A | * | 10/2008 | | F01K 23/06 |
| WO | WO 2004/033859 | | 4/2004 | | |
| WO | WO 2005/103453 | | 3/2005 | | |
| WO | WO 2005103453 A1 | * | 11/2005 | | F01K 23/06 |
| WO | WO 2009133620 A1 | * | 11/2009 | | F02G 5/02 |
| WO | WO 2010/000284 | | 1/2010 | | |

* cited by examiner

WASTE HEAT UTILIZATION DEVICE FOR INTERNAL COMBUSTION ENGINE

RELATED APPLICATIONS

This is a U.S. National Phase Application under 35 USC §371 of International Application PCT/JP2009/052310 filed on Feb. 12, 2009.

This application claims the priority of Japanese Patent Application No. 2008-033024 filed Feb. 14, 2008, the entire content of which is hereby incorporated by reference.

TECHNICAL FIELD

The present invention relates to a waste heat utilization device for an internal combustion engine, and more specifically, to a waste heat utilization device for an internal combustion engine, which is suitable for a vehicle.

BACKGROUND ART

This type of waste heat utilization device for an internal combustion engine includes, for example, a Rankine cycle that is applied to a vehicle equipped with an engine and recovers energy from waste heat generated in the engine, and an ECU (electrical control unit) that controls the Rankine cycle. The Rankine cycle makes a refrigeration circuit where refrigerant runs through a pump, an evaporator, an expander and a condenser in this order.

There is a well-known technology that controls the rotation frequency of the pump to adjust a refrigerant flow rate by means of ECU, adjusts the rotation speed of the expander by controlling the load torque of the expander, and thus enhances recovered energy in the Rankine cycle (see Unexamined Japanese Patent Publication Nos. 2005-30727 and 2006-177266).

One possible way to recover engine waste heat is to provide the Rankine cycle with not only an evaporator but also an exhaust gas heat exchanger for absorbing heat from engine exhaust gas.

However, the above-mentioned conventional technologies do not develop any particular method of controlling the rotation frequency of the pump, which should be employed in the Rankine cycle including the exhaust gas heat exchanger. The enhancement of recovered energy in such a case thus remains an issue.

DISCLOSURE OF THE INVENTION

The invention has been made in light of the above issue. It is an object of the invention to provide a waste heat utilization device for an internal combustion engine, which is capable of effectively enhancing recovered energy in a Rankine cycle having an exhaust gas heat exchanger.

In order to achieve the object, the waste heat utilization device for an internal combustion engine of the invention has a Rankine cycle including an evaporator that heats a working fluid by using waste heat of an internal combustion engine, a heater that further heats the working fluid leaving the evaporator by using the waste heat of the internal combustion engine, an expander that expands the working fluid discharged from the heater and generates a driving force, a condenser that condenses the working fluid discharged from the expander, and a pump that delivers to the evaporator the working fluid discharged from the condenser; and control means that controls actuation of the Rankine cycle. The evaporator is capable of absorbing heat from the waste heat with an upper limit of preset maximum heat absorption amount and transferring the heat to the working fluid. The control means controls the flow rate of the working fluid so that the working fluid evaporated by the evaporator comes into a superheated state in the heater, when the working fluid enters the evaporator at a flow rate equal to or lower than preset flow rate at which the working fluid can absorb the preset maximum heat absorption amount of heat, and controls the flow rate of the working fluid so that the working fluid that overflows the evaporator is evaporated by the heater and then comes into the superheat state, when the working fluid enters the evaporator at a flow rate higher than the preset flow rate.

In the above-described waste heat utilization device for an internal combustion engine, the heater functions as a so-called superheater when the working fluid enters the evaporator at a flow rate equal to or lower than the preset flow rate at which the working fluid can absorb the preset maximum heat absorption amount of heat. In this case, a superheat level in the heater can be controlled by controlling the flow rate of the working fluid. When the working fluid enters the evaporator at a flow rate higher than the preset flow rate, the heater works as an evaporator and a superheater. It is then possible to effectively enhance the recovered energy of the Rankine cycle and downsize the evaporator at the same time.

According to a preferable aspect, in the waste heat utilization device for an internal combustion engine, the control means increases the rotation frequency of the pump during the flow rate control when the working fluid entering the expander has an expander inlet temperature equal to or higher than preset expander inlet temperature.

With this configuration, when the internal combustion engine is under high load, and the capacity of the heater is enhanced to make the working fluid's temperature at an inlet of the expander equal to or higher than given temperature, the flow rate of the working fluid entering the evaporator is increased. The working fluid of a liquid phase which fails to evaporate in the evaporator overflows the evaporator, and the working fluid that overflows the evaporator is evaporated in the heater. This lowers the heater's superheat level. By so doing, simple control that merely changes the rotation frequency of the pump by means of the heater can prevent degradation and deterioration of the working fluid and lubricant added to the working fluid, which are caused when the working fluid temperature at the expander inlet becomes too high.

According to a preferable aspect, in the waste heat utilization device for an internal combustion engine, the control means reduces the rotation frequency of the pump during the flow rate control when the expander inlet temperature of the working fluid entering the expander is lower than the preset expander inlet temperature, and the refrigerant's superheat level in the evaporator is equal to or lower than preset superheat level.

With this configuration, when the working fluid temperature at the expander inlet is equal to or lower than the given temperature, and the working fluid's superheat level in the evaporator is equal to or lower than given superheat level, the flow rate of the working fluid entering the evaporator is reduced, to thereby make the working fluid into high-pressure gas obtained by completely evaporating the working fluid in the evaporator. The high-pressure gas is further superheated by the heater. The expander inlet temperature can be thus increased up to as high temperature as possible. Consequently, the recovered energy can be more effectively enhanced.

According to a preferable aspect, in the waste heat utilization device for an internal combustion engine, the control means reduces the rotation frequency of the pump during the flow rate control when temperature difference between condensing temperature of the working fluid in the condenser and outside air temperature is equal to or higher than preset temperature difference.

With this configuration, if the outside air temperature and the condensing temperature are increased, the condensing temperature can be decreased by reducing the flow rate of the working fluid. As a result, the recovered energy can be more effectively enhanced.

According to a preferable aspect, in the waste heat utilization device for an internal combustion engine, the control means reduces the rotation frequency of the pump during the flow rate control when evaporator outlet temperature of coolant leaving the evaporator is equal to or lower than preset evaporator outlet temperature.

With this configuration, if the evaporator-outlet coolant temperature is decreased too much, the heat absorption amount of the evaporator can be set at a value corresponding to waste heat amount of the internal combustion engine even when the engine is under low load by reducing the flow rate of the working fluid entering the evaporator. The recovered energy can be therefore more effectively enhanced.

According to a preferable aspect, the waste heat utilization device for an internal combustion engine has a coolant circuit including a radiator in which the coolant is refrigerated according to the coolant temperature after being heated with waste heat by refrigerating the internal combustion engine and passing through the evaporator. The control means increases the rotation frequency of the pump during the flow rate control when the coolant flows into the radiator.

With this configuration, when the coolant flows through the radiator, and the waste heat of the internal combustion engine is removed outside the Rankine cycle, the absorption amount in the evaporator can be increased as much as possible by increasing the flow rate of the working fluid entering the evaporator. As a result, the recovered energy can be more effectively enhanced.

According to a preferable aspect, the waste heat utilization device for an internal combustion engine has a generator that converts driving force generated in the expander into electric power. The control means reduces rotation frequency of a fan that carries out heat exchange between the working fluid and outside air in the condenser when power generation amount in the generator is equal to or more than required power generation amount that is required by an external device disposed outside the waste heat utilization device, and increases the rotation frequency of the fan when the power generation amount is less than the required power generation amount.

With this configuration, heat radiation amount in the condenser can be directly controlled, and therefore, the power generation amount can be adjusted to the required amount.

According to a preferable aspect, in the waste heat utilization device for an internal combustion engine, the heater is an exhaust gas heat exchanger that causes exhaust gas of the internal combustion engine as exhaust heat to carry out heat exchange with the working fluid, and includes bypass means that circulates the exhaust gas so that the exhaust gas bypasses the exhaust gas heat exchanger. The control means circulates the exhaust gas by using the bypass means so that the exhaust gas bypasses the exhaust gas heat exchanger when the expander inlet temperature is equal to or higher than preset second expander inlet temperature, and delivers the exhaust gas to the exhaust gas heat exchanger by using the bypass means when the expander inlet temperature is lower than the preset second expander inlet temperature.

With this configuration, it is possible to surely prevent the degradation and deterioration of the working fluid and the lubricant added to the working fluid, which are caused when the working fluid is heated by exhaust gas up to a considerably high temperature.

BEST MODE FOR CARRYING OUT THE INVENTION

Embodiments of the present invention will be described below with reference to the attached drawings. A first embodiment will be first explained.

Figure 1:
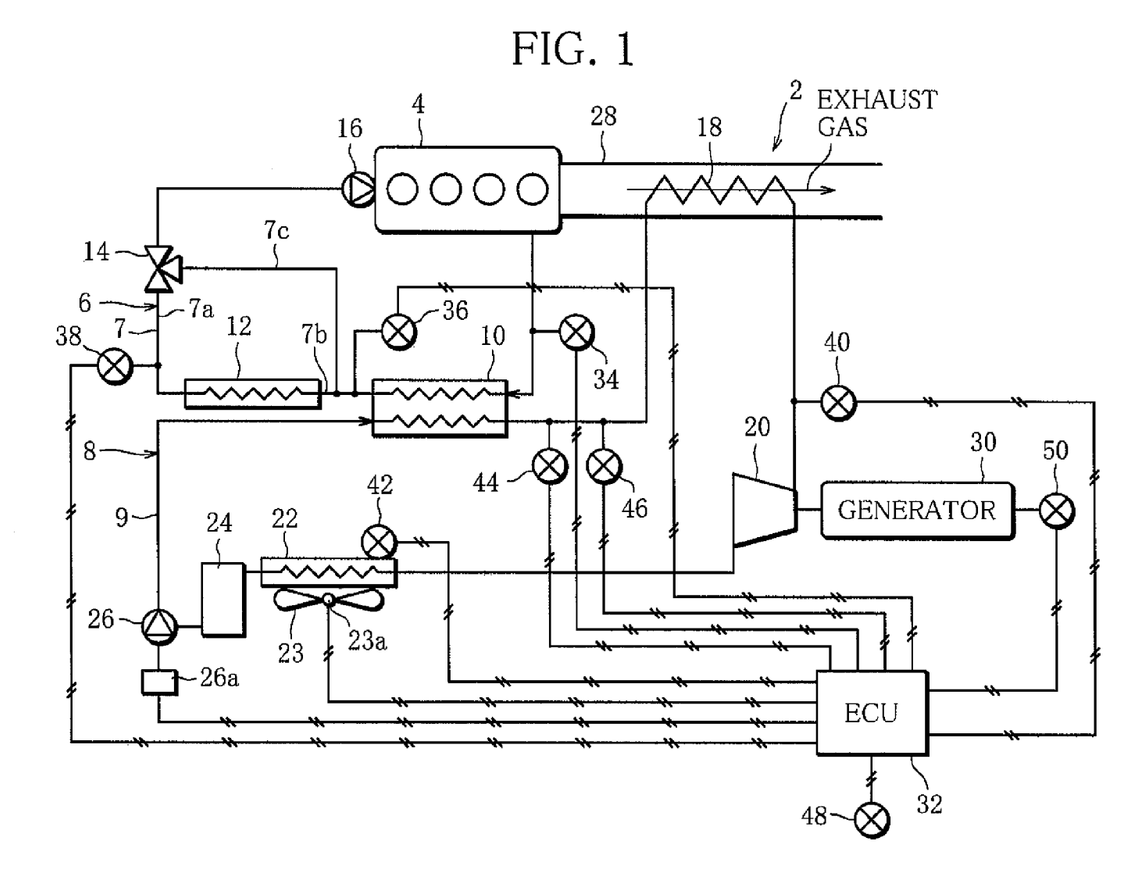
FIG. 1 is a diagram showing a waste heat utilization device for an internal combustion engine according to a first embodiment of the invention.

FIG. 1 is a diagram schematically showing a configuration of a waste heat utilization device 2 of the present embodiment. The waste heat utilization device 2 includes, for example, a coolant circuit 6 that refrigerates a vehicle engine (internal combustion engine) 4, and a Rankine cycle circuit (Rankine cycle) 8 (hereinafter, referred to as an RC circuit) that recovers the waste heat of the engine 4.

The coolant circuit 6 is provided, in a coolant channel 7 extending from the engine 4, with an evaporator 10, a radiator 12, a thermostat 14 and a water pump 16 in the order from the upstream side of a coolant flow. The coolant circuit 6 thus forms a closed circuit.

The evaporator 10 exchanges heat between a coolant of the coolant circuit 6 and a refrigerant of the RC circuit 8. The evaporator 10 thus transfers the waste heat of the engine 4 to the RC circuit 8 side by using the coolant heated in the engine 4, or hot water, as a heat medium, thereby recovering the waste heat of the engine 4. The coolant whose heat is absorbed by the refrigerant when passing through the evaporator 10, again turns into hot water by refrigerating the engine 4.

The radiator 12 is connected in series with the evaporator 10, and further refrigerates the coolant, whose heat has been absorbed by the refrigerant when the coolant passes through the evaporator 10, by carrying out heat exchange between the coolant and outside air.

The thermostat 14 is a mechanical three-way change valve that controls amount of the coolant to be carried to the radiator 12 according to coolant temperature. The thermostat 14 has two inlet ports and one outlet port. Connected to the two inlet ports are a flow channel 7a extending from the radiator 12 and a bypass channel 7c that extends from a flow channel 7b interposed between the evaporator 10 and the radiator 12 to bypass the radiator 12. The amount of the coolant to be carried to the radiator 12 is adjusted according to the coolant temperature, to thereby prevent the engine 4 from being overheated.

The water pump 16 is mounted on the engine 4. The water pump 16 is driven according to revolution of the engine 4 and thus makes the coolant properly circulate through the coolant circuit 6.

A refrigerant channel 9 of the RC circuit 8 is provided with the evaporator 10, a heater 18, an expander 20, a condenser 22, a vapor-liquid separator 24, and a refrigerant pump 26 in the order from the upstream side of a refrigerant flow. The RC circuit 8 thus forms a closed circuit.

The heater 18 is, for example, an exhaust gas heat exchanger that heats the refrigerant by using exhaust gas flowing through an exhaust gas pipe 28 of the engine 4, and heats the refrigerant in the evaporator 10.

The expander 20 is a positive displacement fluid machine that expands the refrigerant, which has been heated into superheated vapor by the evaporator 10 and the heater 18, to generate a rotational driving force. The expander 20 is mechanically connected to a generator 30 that makes the rotational driving force utilizable outside the waste heat utilization device 2 by converting the generated rotational driving force into electric power.

The condenser 22 is an air-cooled heat exchanger that exchanges heat between the refrigerant discharged from the expander 20 and outside air to change the refrigerant into a condensate liquid by a condenser fan 23 being rotated according to a signal entered into an actuator 23a.

The gas-liquid separator 24 is a receiver that divides the refrigerant condensed in the condenser 22 into two layers of gas and liquid. Only the liquid refrigerant separated here is discharged to the refrigerant pump 26 side.

The refrigerant pump 26 is an electric pump that is driven according to a signal entered into an actuator 26a thereof. The liquid refrigerant condensed in the condenser 22 and separated in the gas-liquid separator 24 is pumped to the evaporator 10 side by the refrigerant pump 26, thereby properly circulating through the RC circuit 8.

The waste heat utilization device 2 is provided with an electrical control unit (ECU) (control means) 32 that carries out comprehensive control of a vehicle and the waste heat utilization device 2. Not only the actuators 23a and 26a but also various sensors are electrically connected to the ECU 32.

To be specific, the coolant circuit 6 is provided with a waste heat temperature sensor 34, which detects engine waste heat temperature $T_1$ that is the temperature of the coolant heated in the engine 4, between an outlet of the engine 4 and an inlet of the evaporator 10; an evaporator outlet temperature sensor 36, which detects evaporator-outlet coolant temperature $T_2$, between the outlet of the evaporator 10 and a diverging point at which the bypass channel 7c diverges from the flow channel 7b; and a radiator passing-water flow-rate sensor 38, which detects flow rate F of coolant passing through in the radiator 12, between the radiator 12 and the thermostat 14.

The RC circuit 8 is provided with an expander inlet temperature sensor 40, which detects expander-inlet refrigerant temperature $T_3$, between an outlet of the exhaust gas heat exchanger 18 and an inlet of the expander 20; a condenser temperature sensor 42, which detects refrigerant condensation temperature $T_4$, in the condenser 22; an evaporator outlet pressure sensor 44, which detects evaporator-outlet refrigerant pressure P, and an evaporator outlet temperature sensor 46, which detects evaporator-outlet refrigerant temperature $T_5$, between the evaporator 10 and the exhaust gas heat exchanger 18; an outside air temperature sensor 48 that detects outside air temperature $T_6$; and a power generation amount sensor 50 that detects power generation amount E of the generator 30.

The ECU 32 carries out Rankine cycle control (flow rate control) in which rotation frequency $N_1$ of the refrigerant pump 26 and rotation frequency $N_2$ of the condenser fan 23 are controlled according to the temperatures $T_1$ to $T_6$, pressure P, flow rate F and power generation amount E, which are detected by the above-mentioned various sensors.

Figure 2:
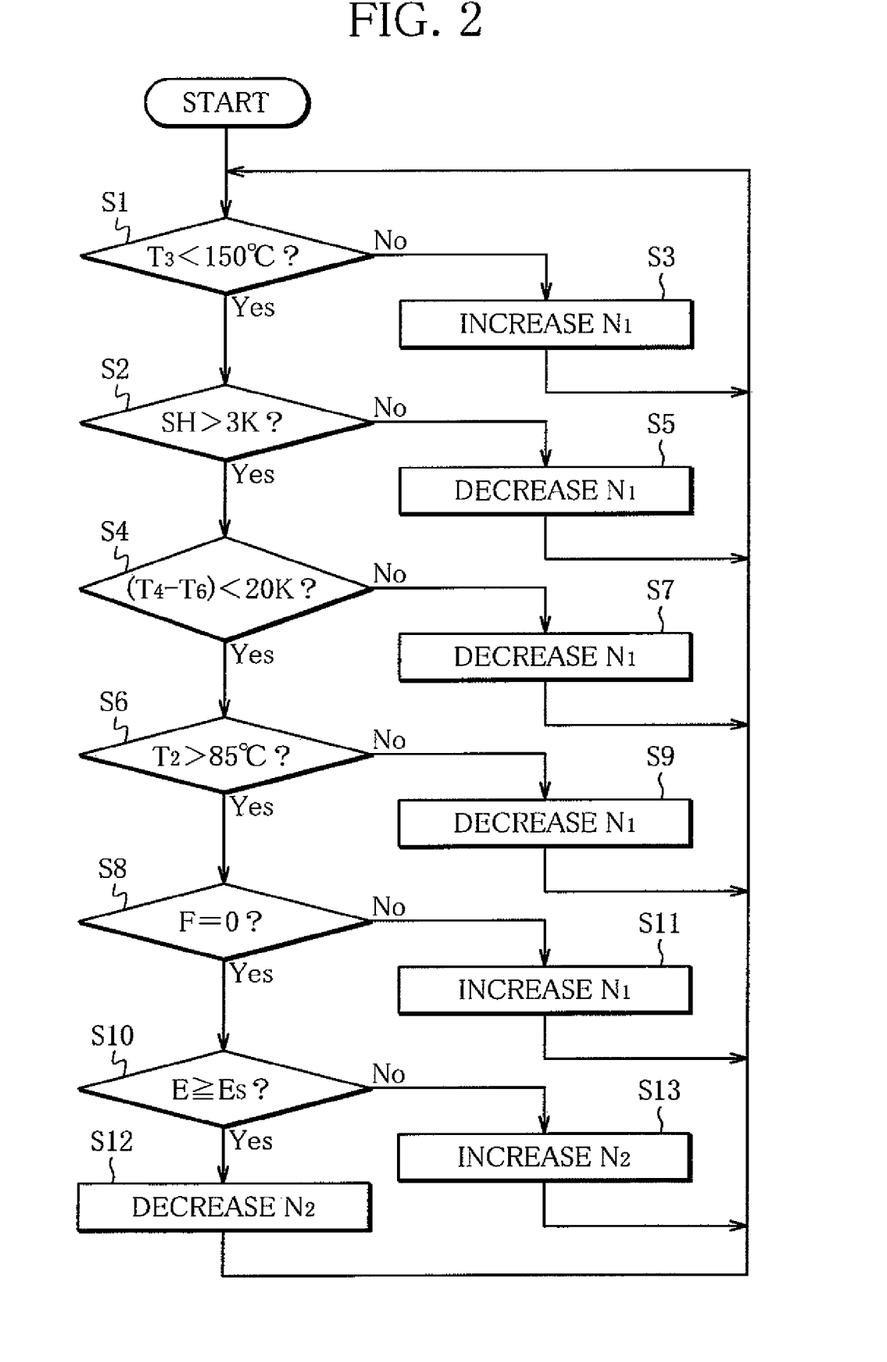
FIG. 2 is a flowchart showing a control routine of Rankine cycle control that is carried out in an ECU shown in FIG. 1.

The Rankine cycle control will be described below in detail with reference to the flowchart shown in FIG. 2.

When the Rankine cycle control is started while the refrigerant pump 26 and the condenser fan 23 are actuated at preset initial rotation frequency, the routine proceeds to S1 (hereinafter, S means a step).

S1 makes a determination as to whether the expander-inlet refrigerant temperature $T_3$ detected by the expander inlet temperature sensor 40 is lower than, for example, 150° C. If the result is YES, and it is determined that $T_3>150°$ C. is true, the routine moves to S2. If the result is NO, and it is determined that $T_3>150°$ C. is not true, the routine advances to S3.

If the routine moves to S2, refrigerant evaporation temperature Tr·sat is calculated on the basis of the engine waste heat temperature $T_1$ detected by the waste heat temperature sensor 34 and the evaporator-outlet refrigerant pressure P detected by the evaporator outlet pressure sensor 44. Furthermore, a superheat level SH of the refrigerant at the outlet of the evaporator 10 is calculated as temperature difference that is obtained by subtracting the refrigerant evaporation temperature Tr·sat from the evaporator-outlet refrigerant temperature $T_5$ detected by the evaporator outlet temperature sensor 46. It is then determined whether the superheat level SH is higher than, for example, about 3K (Kelvin). If the result is YES, and it is determined that SH>3K is true, the routine advances to S4. If the result is NO, and it is determined that SH>3K is not true, the routine moves to S5. In this case, the superheat level SH at which a heat capacity of the evaporator 10 can be used to the fullest extent is set at about 3K.

If the routine advances to S3, the rotation frequency $N_1$ of the refrigerant pump 26 is increased, and the control routine returns to START.

If the routine moves from S2 to S4, a determination is made as to whether temperature difference ΔT obtained by subtracting outside air temperature $T_6$ detected by the outside air temperature sensor 48 from the refrigerant condensation temperature $T_4$ detected by the condensation temperature sensor 42 is smaller than, for example, about 20K (Kelvin). If the result is YES, and it is determined that $(T_4-T_6)<20K$ is true, the routine advances to S6. If the result is NO, and it is determined that $(T_4-T_6)<20K$ is not true, the routine moves to S7. In order to secure a sufficient pressure ratio, ΔT is set at about 20K.

If the routine proceeds to S6, a determination is made as to whether the evaporator-outlet coolant temperature $T_2$ detected by the evaporator outlet temperature sensor 36 is higher than, for example, 85° C. If the result is YES, and it is determined that $T_2>85°$ C. is true, the routine advances to S8. If the result is NO, and it is determined that $T_2>85°$ C. is not true, the routine moves to S9. In this case, the temperature at which the thermostat 14 is opened is set at a value higher than at least 85° C.

If the routine advances to S5, S7 or S9, the rotation frequency $N_1$ of the refrigerant pump 26 is reduced in any case, and the control routine returns to START.

If the routine moves from S6 to S8, a determination is made as to whether the flow rate F of the coolant passing through the radiator 12, which is detected by the radiator passing-water flow-rate sensor 38, is zero. If the result is YES, and it is determined that F=0 is true, the routine moves to S10. If the result is NO, and it is determined that F=0 is not true, or that F>0 is true, the routine proceeds to S11.

If the routine moves to S10, a determination is made as to whether the power generation amount E of the generator 30, which is detected by the power generation amount sensor 50, is equal to or more than preset required power generation amount $E_s$. If the result is YES, and it is determined that $E \geq E_S$ is true, the routine advances to S12. If the result is NO, and it is determined that $E \geq E_s$ is not true, the routine moves to S13.

If the routine advances to S11, the rotation frequency $N_1$ of the refrigerant pump 26 is increased, and the control routine returns to START as in S3.

If the routine advances from S10 to S12, the rotation frequency $N_2$ of the condenser fan 23 is reduced, and the control routine returns to START. If the routine proceeds to S13, the rotation frequency $N_2$ of the condenser fan 23 is increased, and the control routine returns to START.

As described above, once the Rankine cycle control is started in the ECU 32, the round of control routine is repeated.

In the present embodiment, as mentioned, the Rankine cycle control optimizes a balance between heat absorption amount Q in the evaporator and the power generation amount E of the generator 30, or recovered energy $E_R$ of the RC circuit 8 according to the load of the engine 4. Consequently, the recovered energy $E_R$ can be effectively increased while downsizing the evaporator 10 at the same time.

Figure 3:
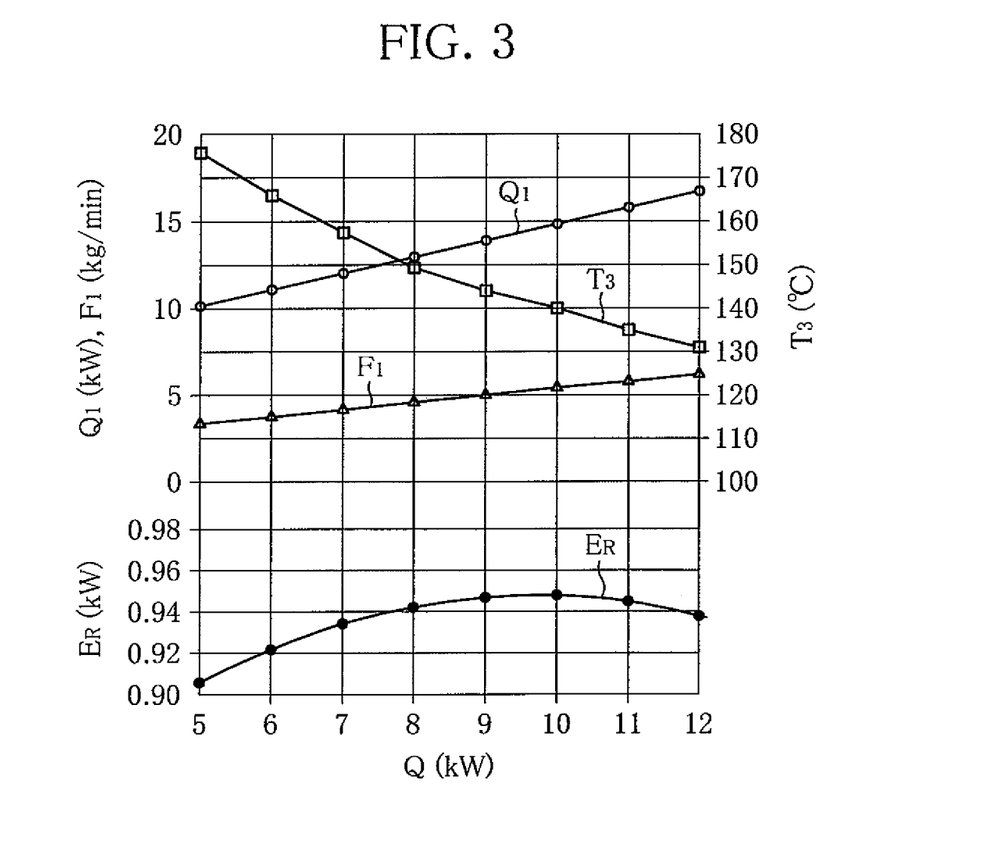
FIG. 3 is an example of a characteristic graph showing recovered energy $E_R$, condenser heat radiation amount Q1, expander inlet temperature T3 and refrigerant flow rate F1, with respect to evaporator input Q.

FIG. 3 is an example of a characteristic graph showing recovered energy $E_R$, heat radiation amount $Q_1$ in the condenser 22, or condenser output $Q_1$, expander-inlet refrigerant temperature $T_3$ detected by the expander inlet temperature sensor 40, and flow rate $F_1$ of refrigerant entering the evaporator 10, with respect to evaporator input Q. It is obvious from FIG. 3 that, for example, the recovered energy $E_R$ reaches a maximum value of about 0.95 kW when the evaporator input Q is about 10 kW, and that the expander inlet temperature $T_3$ at this time point is about 140° C. As a maximum heat absorption amount of the evaporator 10, at least a value of about 10 kW is required.

In the present embodiment, the expander-inlet refrigerant temperature $T_3$ is maintained lower than 150° C. by carrying out S1 of the Rankine cycle control. This makes it possible to maintain the evaporator input Q at about 8 kW and simultaneously obtain the recovered energy $E_R$ of about 0.945 kW.

More specifically, in this case, the decrease of the evaporator input Q is about 2 kW, and decrease rate thereof is about 20%. However, the decrease of the recovered energy $E_R$ is about 0.005 kW, and decrease rate thereof is only about 0.5%. One reason for this is that the decrease of the evaporator input Q causes a decrease in the condenser output $Q_1$ and a drop in the refrigerant condensation temperature $T_4$ in the condenser 22, resulting in an increase in the refrigerant's expansion pressure ratio in the expander 20. Another reason is that enthalpy gradient during expansion is increased as a result of a rise in the expander inlet temperature. This makes it possible to reduce the maximum heat absorption amount of the evaporator 10 to a large degree in proportion to the decrease of the recovered energy $E_R$. It is also possible to effectively increase the recovered energy $E_R$ while downsizing the evaporator 10.

Furthermore, when $T_3 < 150°$ C. is not true in S1, or more concretely, when it is determined that there is no room in the heat capacity of the evaporator 10 because of the large evaporator input Q, the rotation frequency $N_1$ of the refrigerant pump 26 is increased, and the flow rate of the refrigerant entering the evaporator 10 is also increased. By so doing, liquid refrigerant that fails to evaporate in the evaporator 10 overflows the evaporator 10. The liquid refrigerant that overflows the evaporator 10 is evaporated in the exhaust gas heat exchanger 18. In other words, if heating amount of the exhaust gas heat exchanger 18 is used to evaporate the liquid refrigerant, $T_3$ is reduced to lower than 150° C. This makes it possible to achieve both the downsizing of the evaporator 10 and the increase of the recovered energy $E_R$ by carrying out the simple control that merely changes the rotation frequency $N_1$ of the refrigerant pump 26 by means of the exhaust gas heat exchanger 18.

If it is determined that $T_3 < 150°$ C. is not true, and if it is also determined in S2 that SH>3K is not true, it is presumed that the refrigerant's superheat level SR in the evaporator 10 is reduced by the overflow of the liquid refrigerant that fails to evaporate in the evaporator 10. In this case, rotation frequency $N_1$ of the refrigerant pump 26 and the flow rate of the refrigerant entering the evaporator 10 are reduced. By so doing, the liquid refrigerant is turned into a high-pressure gas refrigerant obtained by completely evaporating the liquid refrigerant in the evaporator 10. Furthermore, the high-pressure gas refrigerant is heated in the exhaust gas heat exchanger 18. This increases the expander inlet temperature $T_3$ up to about 150° C., and provides the evaporator input Q corresponding to the heat capacity of the downsized evaporator 10, thereby more effectively increasing the recovered energy $E_R$.

When S4 determines that $(T_4-T_6)<20K$ is not true, or more specifically, that there is room in capacity of the condenser 22 due to the large condenser output $Q_1$, the rotation frequency $N_1$ of the refrigerant pump 26 is reduced, and the flow rate of the refrigerant entering the evaporator 10 is thus reduced.

The condenser output $Q_1$ becomes large here because the evaporator input Q is too large. This case corresponds to when the engine 4 is under high load. Temperature difference between the evaporator-outlet refrigerant temperature $T_5$ and the condenser temperature $T_4$ becomes too small, and therefore, the output of the expander 20, or the recovered energy $E_R$, tends to decrease. However, the evaporator input Q can be reduced by decreasing the flow rate of the refrigerant entering the evaporator 10. It is therefore possible to adjust the condenser output $Q_1$ to correspond to the heat capacity of the condenser 22 and thus more effectively increase the recovered energy $E_R$.

When S6 determines that $T_2 > 85°$ C. is not true, or more specifically, that there is room in the heat capacity of the evaporator 10 because the evaporator-outlet coolant temperature $T_2$ is reduced too low, the rotation frequency $N_1$ of the refrigerant pump 26 is reduced, and the flow rate of the refrigerant entering the evaporator 10 is thus reduced.

It is when the engine 4 is under low load, such as during idling, that $T_2$ drops extremely low. In such a case, if the evaporator input Q becomes large, the engine 4 is overly refrigerated, and fuel combustion efficiency in the engine 4 is degraded. Moreover, the coolant temperature is also reduced. Consequently, the recovered energy $E_R$ tends to decrease. However, the evaporator input Q can be adjusted to correspond to the waste heat amount when the engine 4 is under low load by reducing the flow rate of the refrigerant entering the evaporator 10. It is accordingly possible to more effectively increase the recovered energy $E_R$.

When S8 determines that the coolant flow rate F in the radiator 12=0 is not true, or more specifically, that F>0 is true, and the coolant flows into the radiator 12 to remove the waste heat of the engine 4 outside the RC circuit 8, the rotation frequency $N_1$ of the refrigerant pump 26 is increased, and the flow rate of the refrigerant entering the evaporator 10 is thus increased. By so doing, the evaporator input Q can be increased as much as possible. It is therefore possible to more effectively increase the recovered energy $E_R$.

When S10 determines that $E \geq E_s$ is true, the rotation frequency $N_2$ of the condenser fan 23 is reduced. When S10 determines that $E \geq E_s$ is not true, however, the rotation frequency $N_2$ of the condenser fan 23 is increased. In this manner, the condenser output $Q_1$ is directly controlled, which makes the condenser's capacity correspond to required, power generation amount.

Figure 4:
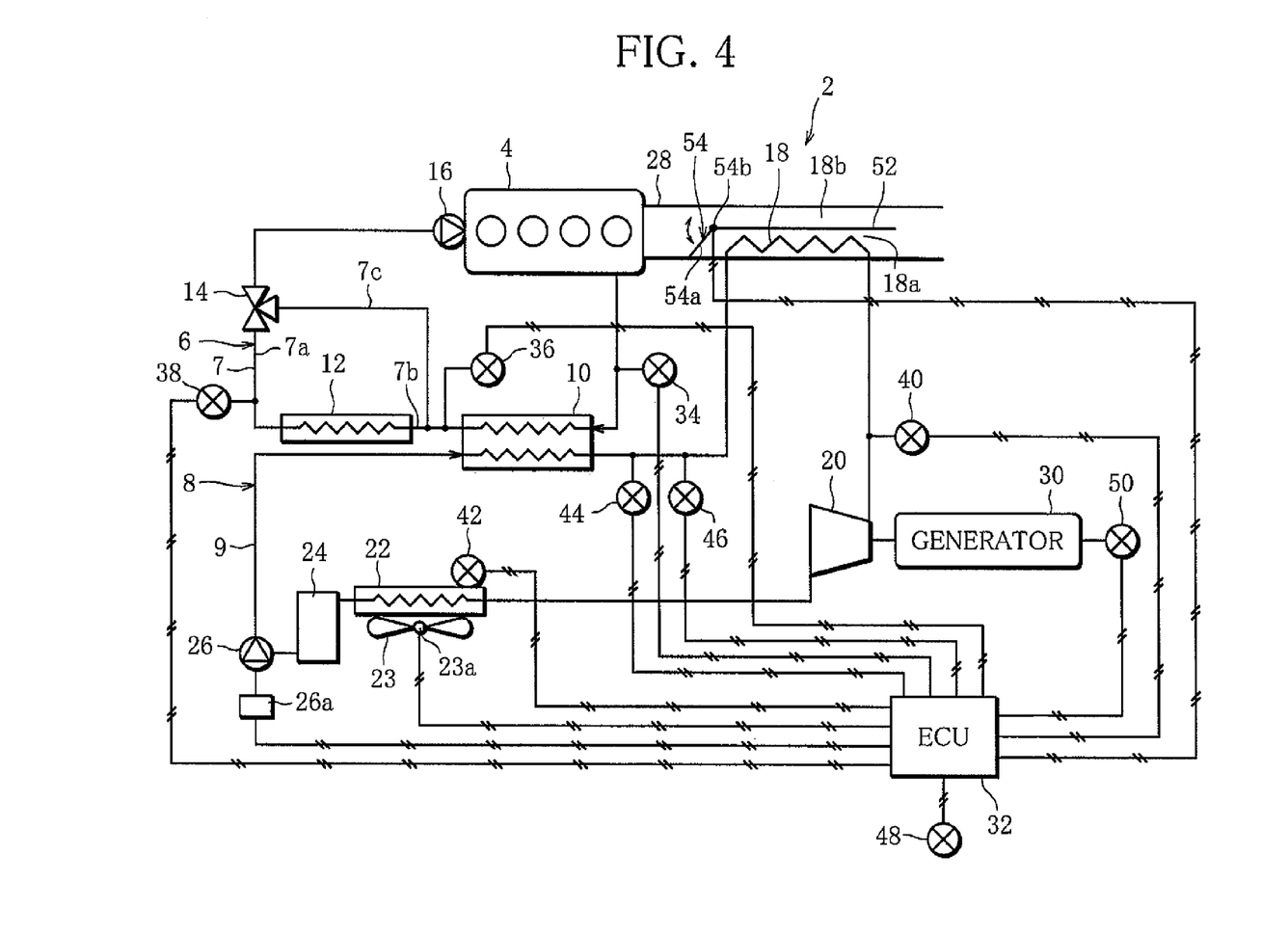
FIG. 4 is a diagram showing a waste heat utilization device for an internal combustion engine according to a second embodiment of the invention.

A second embodiment will be described below with reference to a diagram of the waste heat utilization device 2 shown in FIG. 4.

In the second embodiment, the exhaust gas pipe 28 of the first embodiment is partitioned by a partition plate 52 into a heat exchange side 18a and a non-heat exchange side 18b with respect to the exhaust gas heat exchanger 18. This is to perform damper drive control that uses a damper 54 to direct exhaust gas to either the heat exchange side 18a or the non-heat exchange side 18b. Other than this, the second embodiment has the same configuration as the first.

The damper 54 is mounted on the engine 4-side end portion of the partition plate 52. A movable part 54a of the damper 54 is driven by a driving part 54b that is electrically connected to the ECU 32. The damper 54 thus can direct exhaust gas to either the heat exchange side 18a or the non-heat exchange side 18b.

The ECU 32 carries out damper drive control that controls the damper 54 according to the expander-inlet refrigerant temperature $T_3$ detected by the expander inlet temperature sensor 40.

Figure 5:
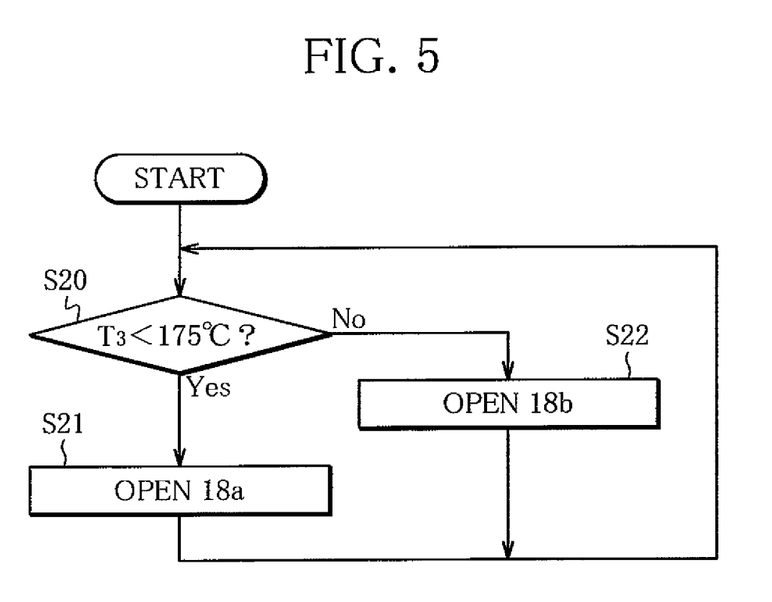
FIG. 5 is a flowchart showing a control routine of damper drive control that is carried out in an ECU shown in FIG. 4.

The damper drive control will be described below with reference to the flowchart shown in FIG. 5.

First, once the damper drive control is started, the routine proceeds to S20.

S20 makes a determination as to whether the expander-inlet refrigerant temperature $T_3$ detected by the expander inlet temperature sensor 40 is lower than, for example, 175° C. If the result is YES, and it is determined that $T_3 < 175°$ C. is true, the routine moves to S21. If the result is NO, and it is determined that $T_3 < 175°$ C. is not true, the routine moves to S22. In this case, temperature at which the refrigerant circulating through the RC circuit 8 and the lubricant added to the refrigerant are surely prevented from being deteriorated and degraded is about 175° C.

If the routine advances to S21, the damper 54 is driven to open the heat exchange side 18a and close the non-heat exchange side 18b in order to direct exhaust gas towards the exhaust gas heat exchanger 18 within the exhaust gas pipe 28. The control routine then returns to START.

If the routine advances to S22, the damper 54 is driven to close the heat exchange side 18a and open the non-heat exchange side 18b in order to make exhaust gas flow in such a way that the exhaust gas bypasses the exhaust gas heat exchanger 18 within the exhaust gas pipe 28. The control routine then returns to START.

In the foregoing manner, once the damper drive control is started in the ECU 32, the round of control routine is repeated independently from the Rankine cycle control.

As described above, the present embodiment effectively increases the recovered energy $E_R$ and downsizes the evaporator 10 at the same time as in the first embodiment.

Especially in the second embodiment, the temperature at which the refrigerant circulating through the RC circuit 8 and the lubricant added to the refrigerant are surely prevented from being deteriorated and degraded is about 175° C. If the damper 54 is driven on the basis of this temperature, the refrigerant and the lubricant added to the refrigerant are prevented from being deteriorated. The recovered energy $E_R$ therefore can be surely increased.

The embodiments of the invention have been described, but the invention is not limited to the above-mentioned embodiments. The invention may be modified in various ways without deviating from the gist thereof.

For example, according to the embodiments, S8 makes a determination as to whether the flow rate F of the coolant flowing through the radiator 12, which is detected by the radiator passing-water flow-rate sensor 38, is zero. Instead, a temperature sensor may be disposed in the outlet of the radiator 12. In this case, too, a determination can be made from the coolant temperature as to whether there is the coolant flowing through the radiator 12.

The embodiments detect the coolant and refrigerant temperatures in the Rankine cycle control. The coolant generally has a greater heat capacity than the refrigerant, so that there is a chance that control is delayed. Concretely, if the rotation frequency $N_1$ of the refrigerant pump 26 is increased or decreased according to the detected coolant temperatures $T_1$ and $T_2$, the load of the engine 4 is estimated by the temperature of exhaust gas and the revolution of the engine 4. It is preferable that a control parameter of the Rankine cycle control is preset to early increase or decrease the rotation frequency $N_1$ of the refrigerant pump 26 according to a result of the estimation because, by so doing, the controllability of the Rankine cycle is further improved.

The embodiments calculate the refrigerant's superheat level SH in the evaporator 10. If the evaporator outlet pressure sensor 44 and the evaporator outlet temperature sensor 46 are disposed as closely as possible to the exhaust gas heat exchanger 18, it is possible to calculate the superheat level SH reflecting a decrease in temperature of the refrigerant between the evaporator 10 and the exhaust gas heat exchanger 18.

Furthermore, in the embodiments, the heater 18 is described as an exhaust gas heat exchanger that directly heats the refrigerant by using the exhaust gas flowing through the exhaust gas pipe 28 of the engine 4. However, the heater 18 may be any heat exchanger as long as it heats the refrigerant leaving the evaporator 10 by using the exhaust gas of the engine 4. For example, the invention may be applied to a circuit configuration in which an exhaust gas heat exchanger is placed in the coolant circuit 6, and the RC circuit 8 is provided with a superheater that carries out heat exchange between the coolant that has passed through the exhaust gas heat exchanger and the refrigerant that has passed through the evaporator 10 to bring the refrigerant into a superheated state, to thereby indirectly transmits exhaust gas heat to the refrigerant through the superheater.

The invention claimed is:

1. A waste heat utilization device for an internal combustion engine, comprising:
   a Rankine cycle including an evaporator that evaporates and superheats a working fluid by using waste heat of an internal combustion engine, a superheater that further superheats the working fluid leaving the evaporator by using the waste heat of the internal combustion engine, an expander that expands the working fluid discharged from the superheater and generates a driving force, a condenser that condenses the working fluid discharged from the expander, and a pump that delivers to the evaporator the working fluid discharged from the condenser; and an electrical control unit configured to control actuation of the Rankine cycle such that the electrical control unit conducts flow rate control of the working fluid by:
(a) reducing a rotation frequency of the pump when an expander inlet temperature of the working fluid entering the expander is lower than a preset expander inlet temperature and a superheat level of the working fluid in the evaporator is equal to or lower than a preset superheat level, thereby making the working fluid into high-pressure gas obtained by evaporating and superheating the working fluid in the evaporator, and making the high-pressure gas further superheat in the superheater, and
(b) increasing the rotation frequency of the pump during the flow rate control to increase a flow rate of the working fluid flowing into the evaporator when the working fluid entering the expander has an expander inlet temperature equal to or higher than said preset expander inlet temperature, thereby allowing a liquid-phase working fluid that fails to evaporate in the evaporator to overflow the evaporator, and evaporating and superheating in the superheater the liquid-phase working fluid that failed to be fully evaporated by the evaporator.

2. The waste heat utilization device for an internal combustion engine according to claim 1, wherein the electrical control unit reduces the rotation frequency of the pump during the flow rate control when a temperature difference between a condensing temperature of the working fluid in the condenser and an outside air temperature is equal to or higher than a preset temperature difference.

3. The waste heat utilization device for an internal combustion engine according to claim 2, wherein the electrical control unit reduces the rotation frequency of the pump during the flow rate control when an evaporator outlet temperature of coolant leaving the evaporator is equal to or lower than a preset evaporator outlet temperature.

4. The waste heat utilization device for an internal combustion engine according to claim 3, having a coolant circuit including a radiator in which the coolant is refrigerated according to a coolant temperature after being heated with the waste heat of the internal combustion engine by refrigerating the coolant and passing through the evaporator, wherein:
the electrical control unit increases the rotation frequency of the pump during the flow rate control when the coolant flows into the radiator.

5. The waste heat utilization device for an internal combustion engine according to claim 4, having a generator that converts the driving force generated in the expander into electric power, wherein:
the electrical control unit reduces a rotation frequency of a fan that carries out heat exchange between the working fluid and outside air in the condenser when a power generation amount in the generator is equal to or more than the required power generation amount that is required by an external device disposed outside the waste heat utilization device, and increases the rotation frequency of the fan when the power generation amount is less than the required power generation amount.

6. The waste heat utilization device for an internal combustion engine according to claim 5, wherein the superheater is an exhaust gas heat exchanger that causes exhaust gas of the internal combustion engine as exhaust heat to carry out heat exchange with the working fluid, and includes a damper that circulates the exhaust gas so that the exhaust gas bypasses the exhaust gas heat exchanger; and
the electrical control unit circulates the exhaust gas by using the damper so that the exhaust gas bypasses the exhaust gas heat exchanger when the expander inlet temperature is equal to or higher than a preset second expander inlet temperature, and delivers the exhaust gas to the exhaust gas heat exchanger by using the damper when the expander inlet temperature is lower than the preset second expander inlet temperature.

\* \* \* \* \*